United States Patent
Zhang et al.

(10) Patent No.: US 10,794,985 B2
(45) Date of Patent: *Oct. 6, 2020

(54) REFERENCE SIGNAL CONFIGURATION

(71) Applicant: INTERDIGITAL PATENT HOLDINGS, INC., Wilmington, DE (US)

(72) Inventors: Guodong Zhang, Woodbury, NY (US); Joseph S. Levy, Merrick, NY (US); Philip J. Pietraski, Jericho, NY (US); Janet A. Stern-Berkowitz, Little Neck, NY (US); Charles A. Dennean, Melville, NY (US); Marian Rudolf, Montreal (CA); John W. Haim, Baldwin, NY (US)

(73) Assignee: InterDigital Patent Holdings, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/517,858

(22) Filed: Jul. 22, 2019

(65) Prior Publication Data
US 2020/0011957 A1    Jan. 9, 2020

Related U.S. Application Data

(63) Continuation of application No. 14/967,513, filed on Dec. 14, 2015, now Pat. No. 10,359,499, which is a
(Continued)

(51) Int. Cl.
*H04L 5/00* (2006.01)
*G01S 5/00* (2006.01)
(Continued)

(52) U.S. Cl.
CPC .......... *G01S 5/0045* (2013.01); *G01S 5/0009* (2013.01); *H04L 5/0048* (2013.01);
(Continued)

(58) Field of Classification Search
CPC ... H04L 5/0053; H04L 5/0007; H04L 5/0004; G01S 5/0009
(Continued)

(56) References Cited

U.S. PATENT DOCUMENTS 5,418,573 A    5/1995  Basile et al.
6,204,808 B1   3/2001  Bloebaum
(Continued)

OTHER PUBLICATIONS

Alcatel-Lucent et al., "Way Forward on Further Considerations on RS Design for LTE-A (Revised)," Agenda Item 15.1, 3GPP TSG RAN WG1 #56bis; R1-091657, Seoul, Korea (Mar. 23-27, 2009).
(Continued)

*Primary Examiner* — William D Cumming
(74) *Attorney, Agent, or Firm* — Volpe and Koenig, P.C.

(57) ABSTRACT

A wireless transmit receive unit (WTRU) is configured to receive a reference signal of a first type. The first type is other than a demodulation reference signal (DM-RS). Reference signals of the first type are received in resource elements other than resource elements used for a primary synchronization signal or a secondary synchronization signal. The WTRU is configured to receive a radio resource control message indicating a subframe position in which the reference signal of the first type is transmitted and a periodicity of a transmission of the reference signal of the first type.

10 Claims, 5 Drawing Sheets

Related U.S. Application Data continuation of application No. 12/768,033, filed on Apr. 27, 2010, now Pat. No. 9,234,957.

(60) Provisional application No. 61/234,018, filed on Aug. 14, 2009, provisional application No. 61/233,723, filed on Aug. 13, 2009, provisional application No. 61/219,218, filed on Jun. 22, 2009, provisional application No. 61/173,054, filed on Apr. 27, 2009.

(51) Int. Cl.
    *H04L 27/26*     (2006.01)
    *H04W 72/12*     (2009.01)

(52) U.S. Cl.
    CPC ........ *H04L 5/0053* (2013.01); *H04L 27/2613* (2013.01); *H04L 27/2655* (2013.01); *H04W 72/1247* (2013.01)

(58) Field of Classification Search
    USPC .................................................. 370/329, 328
    See application file for complete search history.

(56) References Cited

U.S. PATENT DOCUMENTS

| | | | |
|---|---|---|---|
| 6,522,301 B2 | 2/2003 | Takayama et al. | |
| 6,697,629 B1 | 2/2004 | Grilli et al. | |
| 7,940,740 B2 | 5/2011 | Krishnamurthy et al. | |
| 8,730,925 B2 | 5/2014 | Frank et al. | |
| 8,761,101 B1 | 6/2014 | Crosbie et al. | |
| 8,862,145 B2 | 10/2014 | Chin et al. | |
| 8,867,331 B2 | 10/2014 | Dai et al. | |
| 8,964,579 B2 | 2/2015 | Han et al. | |
| 9,037,132 B1 | 5/2015 | Pulugurta et al. | |
| 9,042,914 B2 | 5/2015 | Harvey et al. | |
| 9,234,957 B2 * | 1/2016 | Stern-Berkowitz .......... G01S 5/0009 | |
| 9,503,231 B2 | 11/2016 | Gaal et al. | |
| 9,888,430 B2 | 2/2018 | Han et al. | |
| 9,930,649 B2 | 3/2018 | Shi et al. | |
| 10,027,463 B2 | 7/2018 | Wang et al. | |
| 10,091,659 B2 | 10/2018 | Ng et al. | |
| 10,111,224 B2 | 10/2018 | Lee et al. | |
| 10,359,499 B2 * | 7/2019 | Zhang ................... G01S 5/0045 | |
| 2002/0050952 A1 | 5/2002 | Takayama et al. | |
| 2004/0203912 A1 | 10/2004 | Budka et al. | |
| 2004/0214584 A1 | 10/2004 | Marinier | |
| 2005/0037775 A1 | 2/2005 | Moeglein et al. | |
| 2009/0046650 A1 | 2/2009 | Dalsgaard et al. | |
| 2009/0116434 A1 * | 5/2009 | Lohr ..................... H04L 5/0064 370/329 | |
| 2010/0195566 A1 * | 8/2010 | Krishnamurthy ..... H04L 5/0007 370/328 | |
| 2010/0260154 A1 | 10/2010 | Frank et al. | |
| 2012/0057498 A1 | 3/2012 | Han et al. | |
| 2013/0083753 A1 | 4/2013 | Lee et al. | |
| 2015/0365178 A1 | 12/2015 | Maattanen et al. | |
| 2016/0097835 A1 | 4/2016 | Zhang et al. | |
| 2016/0241323 A1 | 8/2016 | Ko et al. | |
| 2016/0261325 A1 | 9/2016 | Ko et al. | |
| 2017/0126292 A1 | 5/2017 | Takano | |
| 2017/0289818 A1 | 10/2017 | Ng et al. | |

OTHER PUBLICATIONS

Ericsson et al., "Downlink Demodulation RS Design for Rel-9 and Beyond," Agenda Item 15.1, 3GPP TSG RAN WG1 #57bis; R1-092734, Los Angeles, USA (Jun. 29-Jul. 3, 2009).

Ericsson et al., "Draft CR 36.211 Introduction of LTE Positioning", 3GPP TSG-RAN WG1, Meeting #57bis, R1-092854, (Los Angeles, USA, Jun. 29-Jul. 3, 2009).

Ericsson et al., "Draft CR 36.214 Introduction of LTE Positioning", 3GPP TSG-RAN WG1, Meeting #57bis, R1-092856, (Los Angeles, USA, Jun. 29-Jul. 3, 2009).

Ericsson et al., "Way Forward on OTDOA Positioning," 3GPP RAN1 #56bis; R1-091648, Seoul, South Korea (Mar. 2009).

Ericsson et al., "WF on RAN1 Concept for OTDOA," 3GPP RAN1 #57; R1-092213.

Ericsson, "On OTDOA Method for LTE Positioning", 3GPP TSG-RAN WG1 #56, Agenda Item 10, R1-090918 Athens, Greece, (Feb. 9-13, 2009).

ETSI MCC, "Draft Report of 3GPP TSG RAN WG2 Meeting #66bis," 3GPP TSG-RAN WG2, Meeting #67, R2-094121, (Shenzhen, China, Aug. 4-8, 2009).

MCC Support "Draft Report of 3GPP TSG-RAN WG1, Meeting #57bis v0.1.0," R1-09xxxx, (Shenzen China, Aug. 24-28, 2009).

Motorola, "Results on accuracy of OTDOA-based positioning in LTE," 3GPP TSG RAN1 #56bis, R1-091337 (Mar. 23-27, 2009).

Nokia et al., "Study Assumptions for LTE Positioning Support", Agenda Item 10, 3GPP TSG-RAN WG1 #56; R1-090838, Athens, Greece, (Feb. 9-13, 2009).

Qualcomm Europe et al, "Positioning Support for LTE", 3GPP TSG-RAN #42, RP-080995, (Athens, Greece, Dec. 2-5, 2008).

Qualcomm Europe, "On OTDOA in LTE," 3GPP TSG-RAN WG1 #55bis, R1-090353 (Jan. 12-19, 2009).

Third Generation Partnership Project, "Technical Specification Group Radio Access Network; Evolved Universal Terrestrial Radio Access (E-UTRA); Physical Channels and Modulation (Release 8)", 3GPP TS 36.211 V8.6.0 (Mar. 2009).

Third Generation Partnership Project, "Technical Specification Group Radio Access Network; Evolved Universal Terrestrial Radio Access (E-UTRA); Physical Channels and Modulation (Release 9)", 3GPP TS 36.211 V9.1.0 (Mar. 2010).

Third Generation Partnership Project, "Technical Specification Group Radio Access Network; Stage 2 Functional Specification of User Equipment (UE) Positioning in UTRAN (Release 8)", 3GPP TS 25.305, V8.1.0, (Dec. 2008).

Third Generation Partnership Project, "Technical Specification Group Radio Access Network; Stage 2 Functional Specification of User Equipment (UE) Positioning in UTRAN (Release 9)", 3GPP TS 25.305, V9.0.0, (Dec. 2009).

Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331, V8.5.0, (Mar. 2009).

Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331, V8.9.0, (Mar. 2010).

Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331, V9.2.0, (Mar. 2010).

Third Generation Partnership Project, "Technical Specification Group Radio Access Network; Physical layer procedures (FDD) (Release 1999)," 3GPP TS 25.214 V3.12.0 (Mar. 2003).

Third Generation Partnership Project, "Technical Specification Group Radio Access Network; Physical layer procedures (FDD) (Release 4)," 3GPP TS 25.214 V4.6.0 (Mar. 2003).

Third Generation Partnership Project, "Technical Specification Group Radio Access Network; Physical layer procedures (FDD) (Release 5)," 3GPP TS 25.214 V5.11.0 (Jun. 2005).

Third Generation Partnership Project, "Technical Specification Group Radio Access Network; Physical layer procedures (FDD) (Release 6)," 3GPP TS 25.214 V6.11.0 (Dec. 2006).

Third Generation Partnership Project, "Technical Specification Group Radio Access Network; Physical layer procedures (FDD) (Release 7)," 3GPP TS 25.214 V7.15.0 (Mar. 2010).

Third Generation Partnership Project, "Technical Specification Group Radio Access Network; Physical layer procedures (FDD) (Release 8)," 3GPP TS 25.214 V8.9.0 (Mar. 2010).

Third Generation Partnership Project, "Technical Specification Group Radio Access Network; Physical layer procedures (FDD) (Release 9)," 3GPP TS 25.214 V9.2.0 (Mar. 2010).

(56) References Cited

OTHER PUBLICATIONS

Third Generation Partnership Project, "Technical Specification Group Radio Access Network; Physical layer procedures (FDD) (Release 7)," 3GPP TS 25.214 V7.11.0 (Mar. 2009).

Third Generation Partnership Project, "Technical Specification Group Radio Access Network; Physical layer procedures (FDD) (Release 8)," 3GPP TS 25.214 V8.5.0 (Mar. 2009).

Third Generation Partnership Project, "Technical Specification Group Radio Access Network; Evolved Universal Terrestrial Radio Access (E-UTRA); Physical Channels and Modulation (Release 8)," 3GPP TS 36.211 V8.9.0 (Dec. 2009).

Third Generation Partnership Project, Technical Specification Group Radio Access Network; Evolved Universal Terrestrial Radio Access (E-UTRA); Physical layer procedures (Release 8), 3GPP TS 36.213 V8.6.0 (Mar. 2009).

Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).

Third Generation Partnership Project, "Technical Specification Group Radio Access Network; Evolved Universal Terrestrial Radio Access (E-UTRA); Physical layer procedures (Release 9)," 3GPP TS 36.213 V9.1.0 (Mar. 2010).

Third Generation Partnership Project, "Technical Specification Group Radio Access Network; Stage 2 functional specification of User Equipment (UE) positioning in UTRAN (Release 4)," 3GPP TS 25.305 V4.7.0 (Dec. 2003).

Third Generation Partnership Project, "Technical Specification Group Radio Access Network; Stage 2 functional specification of User Equipment (UE) positioning in UTRAN (Release 7)," 3GPP TS 25.305 V7.4.0 (Sep. 2007).

Third Generation Partnership Project, "Technical Specification Group Radio Access Network; Stage 2 functional specification of User Equipment (UE) positioning in UTRAN (Release 1999)," 3GPP TS 25.305 V3.11.0 (Dec. 2003).

Third Generation Partnership Project, "Technical Specification Group Radio Access Network; Stage 2 functional specification of User Equipment (UE) positioning in UTRAN (Release 5)," 3GPP TS 25.305 V5.9.0 (Jun. 2004).

Third Generation Partnership Project, "Technical Specification Group Radio Access Network; Stage 2 functional specification of User Equipment (UE) positioning in UTRAN (Release 6)," 3GPP TS 25.305 V6.1.0 (Jun. 2004).

Third Generation Partnership Project, "Technical Specification Group Radio Access Network; Evolved Universal Terrestrial Radio Access (E-UTRA); LTE Positioning Protocol (LPP) (Release 9)," 3GPP TS 36.355 V9.0.0 (Dec. 2009).

* cited by examiner

REFERENCE SIGNAL CONFIGURATION

CROSS REFERENCE TO RELATED APPLICATIONS

This application is a continuation of U.S. patent application Ser. No. 14/967,513 filed Dec. 14, 2015, which issued as U.S. Pat. No. 10,359,499 on Jul. 23, 2019, which is a continuation of U.S. patent application Ser. No. 12/768,033, filed Apr. 27, 2010, which issued as U.S. Pat. No. 9,234,957 on Jan. 12, 2016, which claims the benefit of U.S. provisional application No. 61/173,054 filed Apr. 27, 2009; U.S. provisional application No. 61/219,218 filed Jun. 22, 2009; U.S. provisional application No. 61/233,723 filed Aug. 13, 2009; and U.S. provisional application No. 61/234,018 filed Aug. 14, 2009, which are incorporated by reference as if fully set forth herein.

FIELD OF INVENTION

This application is related to wireless communications.

BACKGROUND

It is expected that the overall performance of positioning for long term evolution (LTE) will need to be as good as or better than that possible for other access types due to the increasing level of regulatory requirements in some regions and increasing demands imposed by new location service (LCS) applications.

To support these requirements, explicit positioning support should be defined for LTE in a manner compatible with and capable of supporting the emerging $3^{rd}$ Generation Partnership Project (3GPP) control plane solution and the secure user plane location (SUPL) solution in open mobile alliance (OMA). The overall objective should be to achieve parity with or even surpass the capabilities and performance currently provided for other wireless access types including Global System for Mobile communications (GSM), Wideband Code Division Multiple Access (WCDMA), CDMA2000 1×RTT and CDMA2000 EV-DO.

Moreover, the positioning capabilities and features in association with LTE may support: wireless transmit/receive unit (WTRU)-based and WTRU-assisted observed time difference of arrival (OTDOA) methods, Assisted Global Navigation Satellite System (A-GNSS) methods, enhanced cell identification (ECID), and other methods.

For LTE, the WTRU time difference measurements for the OTDOA method may be based on one or more reference signals (RS) from the serving and/or neighbor cells. The RS may be either the existing Common RS (CRS) and/or a newly designed Positioning RS (PRS). The CRS and PRS may be used individually or in combination by the WTRU to derive the measured metrics. When using PRS, measurement in more than one subframe (called a positioning subframe) may be needed to accumulate enough energy to obtain one measurement sample for one or more specific neighbors.

Various issues may exist with using PRS for positioning measurements.

One issue applicable to both LTE frequency division duplexing (FDD) and time division duplexing (TDD) modes, but particularly a problem in a TDD system where a limited number of downlink (DL) subframes is available, is the availability of N consecutive subframes to derive a measurement.

Another issue may relate to the paging mechanism. In LTE Release 8, a mechanism for paging WTRUs has been defined for WTRUs in idle mode and in connected mode. WTRUs periodically monitor the physical downlink control channel (PDCCH) for downlink (DL) assignments masked with a paging radio network temporary identifier (P-RNTI). On a condition that the assignment is detected, the WTRU demodulates the assigned physical downlink shared channel (PDSCH) resource blocks (RBs) and decodes the paging channel (PCH). This process is called monitoring a paging channel.

In idle mode, a WTRU monitors a paging channel to detect incoming calls, system information changes, and Earthquake and Tsunami Warning System (ETWS) notifications for ETWS capable WTRUs. The specific paging frame (PF) and subframe within that PF (a paging occasion (PO)) that the WTRU monitors are determined based on the WTRU identity (ID) and two parameters specified (directly or indirectly) by the network: paging cycle length (in frames) and the number of paging subframes per paging cycle. A WTRU may receive two paging cycle lengths, a cell-specific one (defaultPagingCycle) and a WTRU-specific one; in idle mode, it uses the smaller of the two. From the network perspective, there may be multiple POs within a PF (i.e., more than one subframe may carry PDCCH masked with a P-RNTI), but the WTRU is only required to monitor one PO per PF, and this PO is determined by the parameters specified above, and provided to the WTRU via broadcast system information and/or dedicated signaling information.

The PRS configuration may be such that an idle mode WTRU may be "blocked" from its POs if all of the following conditions are met: the PRS periodicity is less than or equal to the paging cycle (i.e., the minimum of the cell-specific and WTRU specific paging cycles); any of the frames containing the PRS correspond to the WTRU's PF; and any of the subframes used for the PRS correspond to the WTRU's PO subframe.

In connected mode, a WTRU monitors a paging channel and system information block type 1 (SIB1) contents to detect system information changes, and ETWS notifications for ETWS capable WTRUs. The connected mode WTRU does not need to monitor any specific PO. It simply must try to receive pages at the same rate as a WTRU in idle mode using the cell-specific paging cycle. This rate is determined by a system information block type 2 (SIB2) parameter "modificationPeriodCoeff". The network will send system information change pages on all POs during a modification period of length modificationPeriodCoeff×defaultPagingCycle.

The PRS configuration may be such that a connected mode WTRU may be "blocked" from at least some of its POs if all of the following conditions are met: the PRS periodicity is less than or equal to the cell-specific paging cycle; any of the frames containing the PRS correspond to any PF; and any of the subframes used for the PRS correspond to any PO subframes.

Another issue may relate to the handling of PRS in subframes allocated for evolved Multicast Broadcast Multimedia Service (eMBMS). The eMBMS feature introduces support for MBMS services into LTE networks. MBMS transmissions are carried over a multicast channel (MCH) that includes multicast shared channel (MSCH), multicast control channel (MCCH), and multicast traffic channel (MTCH). The MCH is mapped to a Physical MBMS Channel (PMCH) that is mapped to MBSFN allocated subframes. In Release 9 eMBMS, the PMCH cannot be multiplexed with the PDSCH into the same subframe. Although eMBMS is a LTE Release 9 feature, the configuration (i.e., the subframe allocation) of the MBSFN allocated subframes was defined for Release 8 to allow Release 8 WTRUs to know which subframes are allocated for MBMS service. In an MBSFN allocated subframe, a Release 8 WTRU decodes the control region (first 1 or 2 symbols) to obtain acknowledgement and negative acknowledgement (ACK/NACK) and uplink (UL) grant information. In MBSFN allocated subframes, the CRS will be present in the control region, but not in the other symbols of the subframe.

In MBMS allocated subframes, in non-control orthogonal frequency division multiplexing (OFDM) symbols, a different RS, the MBSFN RS, rather than the CRS, is used. MBSFN RSs are only defined for the case of extended prefix, i.e., for the case of 6 symbols per timeslot. MBSFN RSs are transmitted in every resource block (RB) in the configured downlink bandwidth in alternating resource elements (REs) in the $3^{rd}$ symbol of even numbered timeslots and the $1^{st}$ and $5^{th}$ symbols of odd-numbered timeslots.

Another issue may relate to the handling of the PRS in subframes containing other RS such as those currently being defined for LTE and LTE-A (LTE advanced). For the purpose of dual-layer beamforming and higher order multiple-input multiple-output (MIMO), Multi-user MIMO (MU-MIMO) and Coordinated Multipoint Transmission (CoMP), additional Demodulation Reference Symbols (DMRS) are being defined. For Release 9, the number of DMRSs will be 12 per RB, and may only be in RBs containing PDSCH, and not in the control region or in symbols containing the CRS.

For LTE-advanced (LTE-A), a total of 24 DMRSs per RB may be used and these DMRS may also not occur in the control region or in symbols containing the CRS. The DMRS on different antenna ports may be multiplexed by frequency division, code division or a combination of frequency and code division.

In addition to DMRS, LTE-A will be adding Channel State Information (CSI)-RS, located throughout the transmission bandwidth of the cell, to allow the WTRU to perform CSI measurements in support of CoMP and MU-MIMO, as well as to support up to 8 DL transmission antenna ports.

Methods and procedures are needed to support PRS in conjunction with WTRU OTDOA based positioning, MBMS, paging mechanisms, available subframes for allocation which may not be consecutive, subframes containing system signals, and subframes containing RSs, in LTE and LTE-A networks.

SUMMARY

Methods and apparatus for supporting reference signals for positioning measurements are disclosed. Methods include subframe configuration, subframe structures, measurement opportunities using a set of downlink subframes which are not all consecutive, handling of subframes containing reference signals and system signals such as synchronization signals, paging occasions and Multicast Broadcast Multimedia Service (MBMS), and related control signaling between a long term evolution (LTE) network and a wireless transmit/receive unit (WTRU). Moreover, methods to resolve allocation conflicts arising between positioning reference signals and other reference signals are disclosed.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of device capable of operating in a wireless environment. The WTRU may include a home Node-B, an evolved Node-B, a home evolved Node-B, a relay or any other type of moveable device that may require positioning support.

When referred to hereafter, the terminology "base station" includes but is not limited to a Node-B, home Node-B, an evolved Node-B, a home evolved Node-B, a relay, a site controller, an access point (AP), or any other type of interfacing device capable of operating in a wireless environment.

Figure 1:
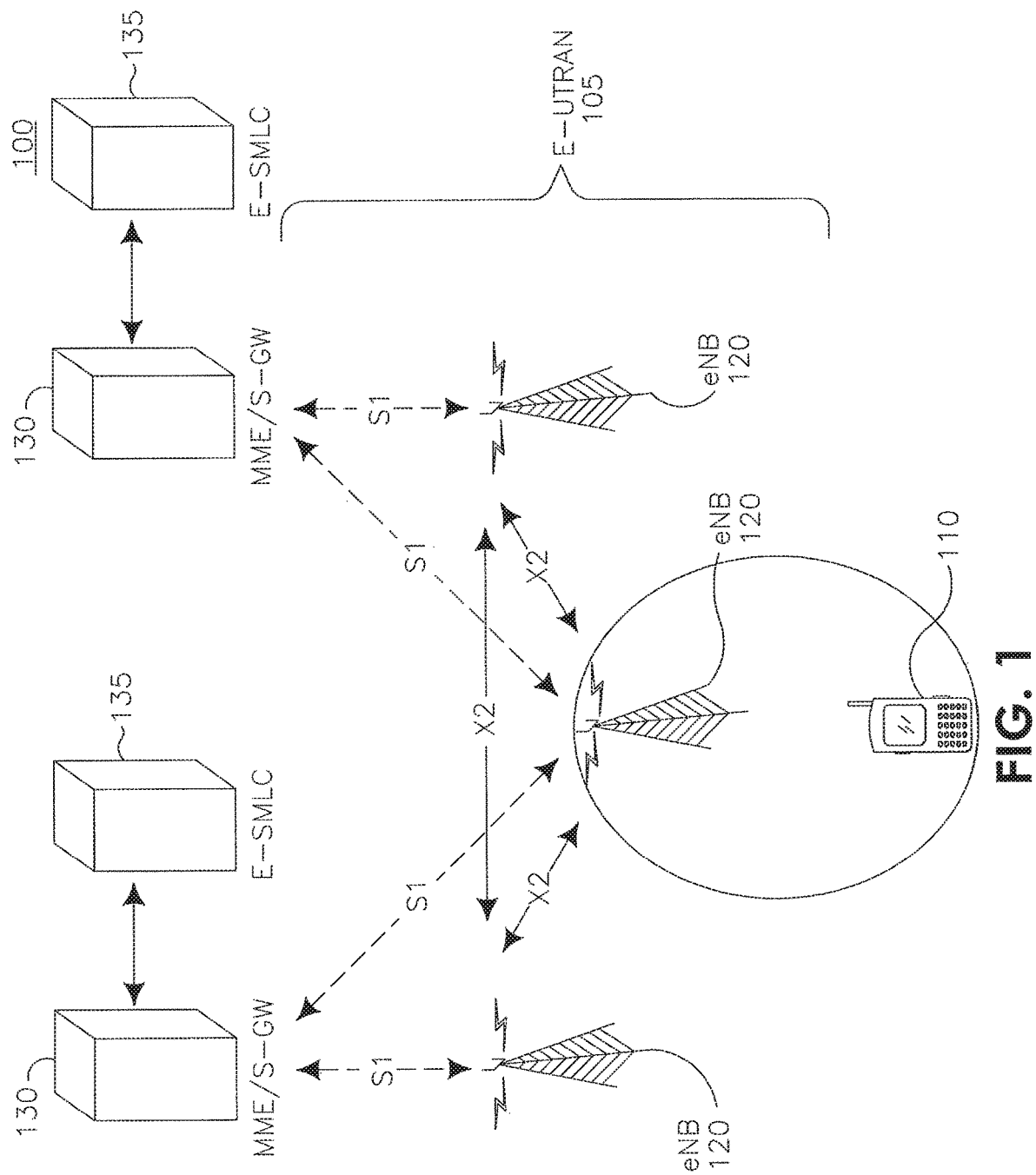
FIG. 1 is an embodiment of a wireless communication system/access network of LTE.

FIG. 1 shows a Long Term Evolution (LTE) wireless communication system/access network 100 that includes an Evolved-Universal Terrestrial Radio Access Network (E-UTRAN) 105. The E-UTRAN 105 includes several evolved Node-Bs (eNBs) 120. The WTRU 110 is in communication with an eNB 120. The eNBs 120 interface with each other using an X2 interface. Each of the eNBs 120 interface with a Mobility Management Entity (MME)/Serving GateWay (S-GW) 130 through an S1 interface. The MME/SGW 130 may interface with an evolved serving mobile location center (E-SMLC) 135 for at least control plane positioning support and for sending location information to or receiving location information from the WTRU 110. The network 100 may include other entities (not shown) such as, but not limited to, a secure user plane location server. Although a single WTRU 110 and three eNBs 120 are shown in FIG. 1, it should be apparent that any combination of wireless and wired devices may be included in the wireless communication system access network 100.

Figure 2:
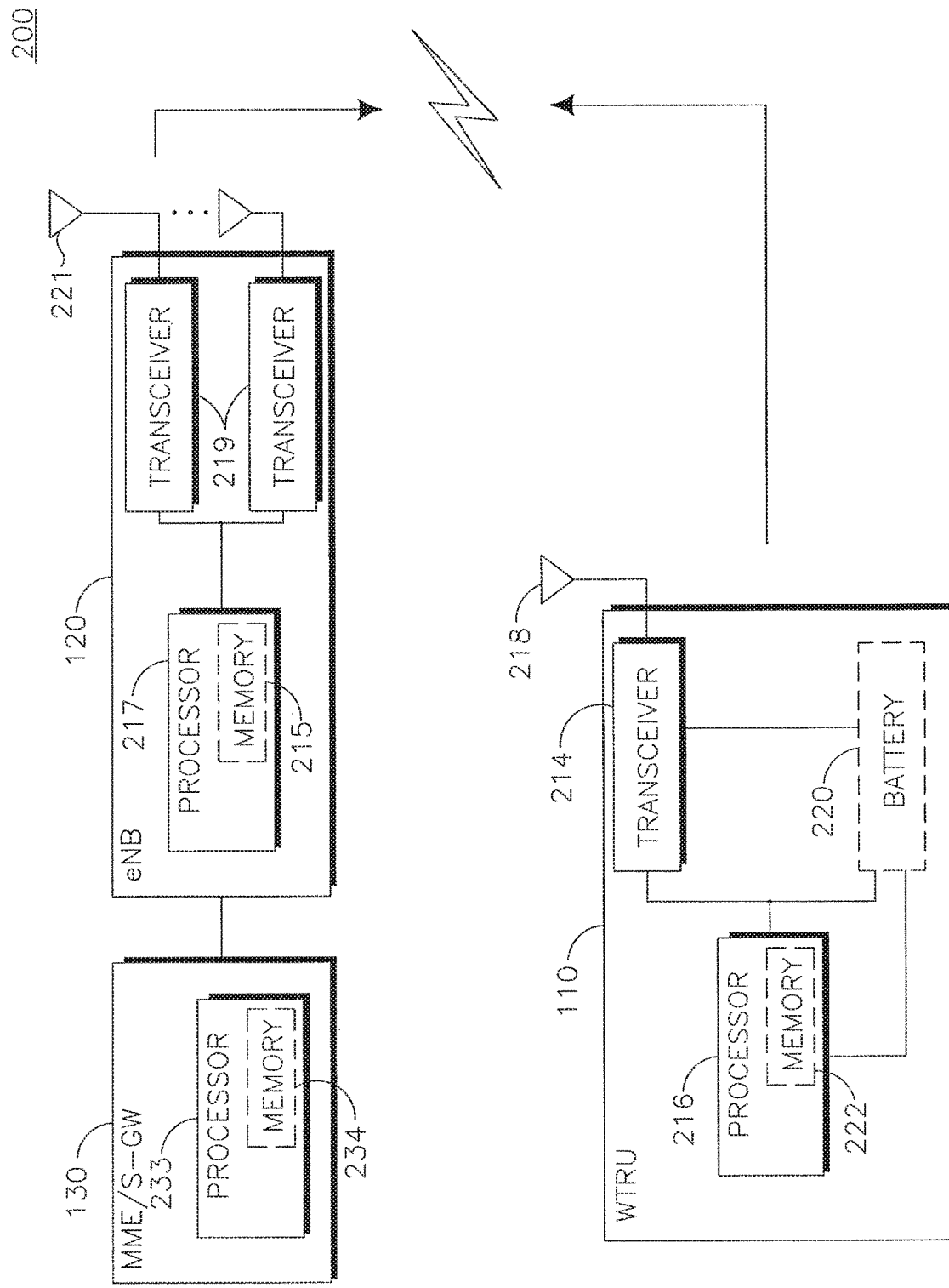
FIG. 2 is an example block diagram of a wireless transmit/receive unit and a base station of LTE wireless communication system.

FIG. 2 is an embodiment of a block diagram of an LTE wireless communication system 200 including the WTRU 110, the eNB 120, and the MME/S-GW 130. As shown in FIG. 2, the WTRU 110, the eNB 120 and the MME/S-GW 130 are configured to allocate and handle reference signals for positioning measurements.

In addition to the components that may be found in a typical WTRU, the WTRU 110 includes a processor 216 with an optional linked memory 222, at least one transceiver 214, an optional battery 220, and one or more antennas 218. The processor 216 is configured to handle reference signals for positioning measurements. The transceiver 214 is in communication with the processor 216 and the antenna(s) 218 to facilitate the transmission and reception of wireless communications. In case a battery 220 is used in the WTRU 110, it powers the transceiver 214 and the processor 216.

In addition to the components that may be found in a typical eNB, the eNB 120 includes a processor 217 with an optional linked memory 215, transceivers 219, and antennas 221. The processor 217 is configured to allocate and handle reference signals for positioning measurements. The transceivers 219 are in communication with the processor 217 and antennas 221 to facilitate the transmission and reception of wireless communications. The eNB 120 is connected to the Mobility Management Entity/Serving GateWay (MME/S-GW) 130 which includes a processor 233 with an optional linked memory 234.

Embodiments disclosed herein may be used separately or together. Embodiments may apply to time division duplexing (TDD) and frequency division duplexing (FDD). Certain examples may be chosen to illustrate TDD, but the embodiments are still applicable to both TDD and FDD unless specifically stated otherwise.

Disclosed herein are methods for allocating and handling reference signals for positioning measurements. These reference signals may be denoted as a positioning reference signal (PRS) herein. A PRS may be defined, for example, as one or more symbols in a time and frequency grid that are known to a signaling base station and a decoding WTRU. The term positioning may be extended to mean any signal defined to be used for measurements in support of positioning. The term positioning signal may be used interchangeably with PRS. The PRS may be used for other purposes in accordance with the methods described herein.

The methods described herein are illustrated with respect to the PRS but are applicable to reference signals in general.

It is understood that the terminology "not mapped" and "punctured" are used interchangeably to refer to situations where the PRS may not use the resource in question due to the presence of other signals, as described herein.

Described herein are embodiments for allocation of PRS(s) in positioning subframes.

In one embodiment, when the PRS(s) are in the same subframe as system signals such as, but not limited to, physical broadcast channel (PBCH), synchronization signals, paging signals, and other such system signals, the allocation of the PRS(s) respect the presence of those system signals. That is, the positioning resource blocks (RBs) will not be allocated to RBs allocated to the system signals.

Figure 4:
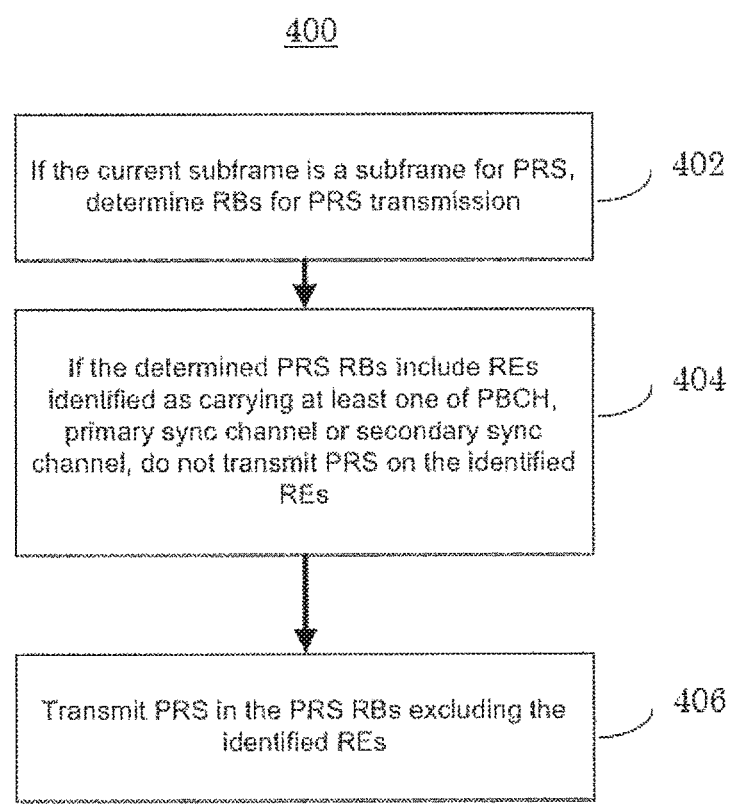
FIG. 4 is a flow diagram of an example procedure for positioning reference signal determination and transmission.

FIG. 4 is a flow diagram of an example procedure 400 for positioning reference signal determination and transmission. In the example of FIG. 4, if the PRS(s) may be allocated into a subframe that carries one or more paging occasions (POs) for at least one WTRU, RBs for PRS transmission may be determined, 402. when the PRS(s) are in subframes in which synchronization signals (SS) (primary and secondary), or PBCH (i.e., master information block (MIB)) or important SIBs (such as SIB1) are present in one or more physical resource blocks (PRBs), the PRS(s) may not be mapped to those REs identified as carrying SS, P-BCH, SIB1, and other system signals, 404. Thus, PRS may be transmitted in the RBs for PRS transmission excluding transmission in the identified REs, 406.

In another embodiment, if there are any Release 8 reference signals (RS) present in a physical resource block (PRB), then one or a combination of options are available. In one option, PRS(s) may not be mapped to those REs that include Release 8 RS(s). In another option, PRS(s) may not be mapped to those REs that include legacy RS(s) in the downlink control region (in LTE Release 8 this means the first n OFDMA symbols, n=1, 2 or 3). PRS(s) may be mapped to those REs that include a Release 8 RS outside the downlink control region. In this manner, the WTRU may perform channel estimation using received PRS(s) in order to detect/decode downlink data. In another option, PRS(s) may be mapped to those REs that include Release 8 RS. In this option, the Release 8 RS(s) may be punctured in those REs. In this way, the WTRU may perform channel estimation using received PRS(s) in order to detect/decode downlink data and control. In another option, Release 8 RS(s) may be incorporated as part of the PRS(s) without impacting Release 8 functionality.

In another embodiment, the mapping of the PRS(s) in subframes containing system signals may be derived from the mapping used in the normal subframes that do not contain these system signals. This mapping rule may be known to the WTRU. No additional signaling may be needed to convey the derivation to the WTRU since the mapping rule may be known to the WTRU and the WTRU may perform the derivation.

In another embodiment, the allocated PRS region occurs over the center bandwidth when the PRS measurement bandwidth is less than the DL system bandwidth in a positioning subframe.

In another embodiment, in the case where an RE may contain a Release 8 demodulation RS (DRS) and may also contain a PRS, the DRS may not be punctured by the PRS. The PRS is punctured.

In another embodiment, in the case where an RE may contain a Release 9/10 demodulation RS (DMRS) and may also contain a PRS, the DMRS may not be punctured by the PRS. The PRS is punctured.

In another embodiment, in the case where an RE may contain a Channel State Information (CSI)-RS and may also contain a PRS, the RE may contain the CSI-RS and the PRS may be punctured.

In another embodiment, in the case where an RE may contain a Channel State Information (CSI)-RS and may also contain a PRS, the CSI-RS may be punctured. The WTRU may use the PRS in this RE as part of its estimation of CSI.

Figure 5:
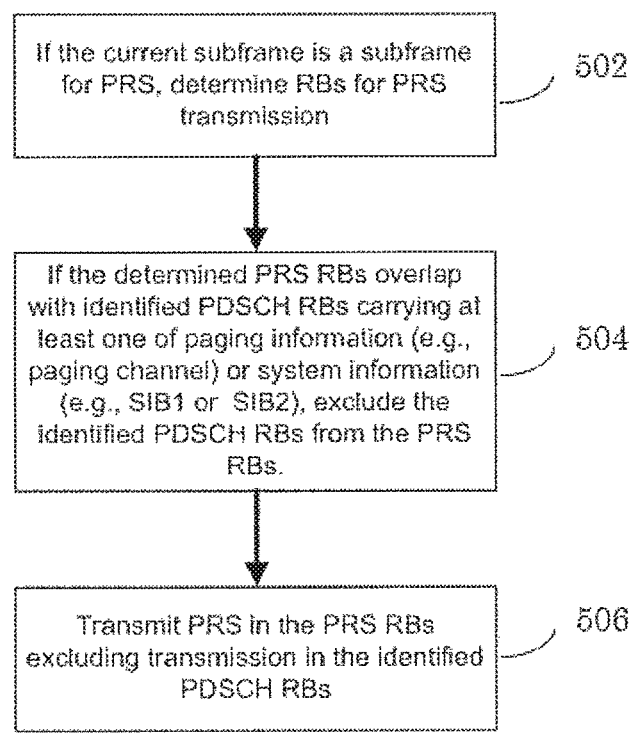
FIG. 5 is a flow diagram of another example procedure for positioning reference signal determination and transmission.

FIG. 5 is a flow diagram of another example procedure 500 for positioning reference signal determination and transmission. In the example of FIG. 5, the PRS(s) may not be sent by a network node, e.g., a base station, in a subframe in RBs carrying a physical downlink shared channel (PDSCH) with paging information. For example, on a condition that the PRS(s) may be allocated into a subframe that carries one or more paging occasions (POs) for at least one WTRU, RBs for PRS transmission may be determined, 502, such that the PRS(s) may pre-empt and substitute RBs for PDSCH carrying regular traffic such as a traffic channel (TCH) allocated in that subframe. However, any RB identified as being used for PDSCH carrying paging information may not carry the PRS(s), 504. Paging information may pertain to a PDSCH carrying a paging channel (PCH), a PDSCH carrying SIB1 or SIB2 system information, a PDSCH using any form of signaling to reach either one or more WTRUs to inform them of pending paging messages, system information changes, public warning system (PWS) notifications, or other similar information, 504. Thus, PRS may be transmitted in the RBs for PRS transmission excluding transmission in the identified PDSCH RBs, 506.

In another embodiment, the PRS(s) may not be sent by a network node, e.g., a base station, in one or more selected subframes carrying a PDSCH with paging information. For example, a WTRU may not be required to decode and measure the PRS(s) in either all or some subframes containing at least one PDSCH carrying paging information. For example, a regularly repeating or a pseudo-random pattern in conjunction with the PRS(s) configuration may be used to disable PRS transmission for the purpose of paging decoding by the WTRU.

In another embodiment, PRS(s) transmission in given subframes, in certain POs, paging frame (PF) occurrences, or for certain RBs carrying PDSCH with paging information, is configured as a function of either PRS configuration parameters, such as PRS occurrence (i.e., starting subframe number and periodicity of subframes containing PRS(s)) or PRS accumulation mode (e.g., number of consecutive subframes containing PRS(s)), or discontinuous reception (DRX) cycles.

In another embodiment, on a condition that the PRS configuration is such that any idle mode WTRU may have all of its POs blocked by the PRS(s), and the WTRU specific DRX cycle is greater than or equal to the cell specific DRX cycle, or the WTRU specific DRX cycle is not specified, the PRS(s) may not be transmitted during these POs. This ensures that all POs are available to idle mode WTRUs, as well as to connected mode WTRUs.

In another embodiment, on a condition that the PRS configuration is such that any idle mode WTRU may have all of its POs blocked by the PRS, and the WTRU specific DRX cycle is less than the cell specific DRX cycle, the PRS may not be transmitted during POs corresponding to PFs determined by the cell specific DRX cycle. This ensures that at least some POs will be available to the WTRU, and that connected mode WTRUs may have all of their known POs available.

In another embodiment, in cases where a conflict exists between a PO for any WTRU and a PRS transmission, the paging transmissions may be restricted to the PDSCH transmissions outside of the RBs utilized for the PRS.

In another embodiment, either all or a subset of the subframes allocated or potentially allocated for paging are designated unavailable for PRS(s) regardless of whether they contain paging information (such as PDSCH carrying PCH) or not. PRS(s) may not be transmitted in the unavailable subframes. For example, subframes potentially allocated for paging are currently subframes 0, 4, 5, and 9 in FDD, or 0, 1, 5, and 6 in TDD. Designating all potentially allocated subframes in FDD unavailable for paging would mean disallowing PRS(s) in subframes 0, 4, 5, and 9. In another example, if based on the paging parameters chosen by the network, if only one subframe is allocated, such as subframe 9, for POs (for any WTRU) in every nth frame, then PRS(s) would not be allowed in that one subframe (e.g., subframe 9) every nth frame or every multiple of n frames (e.g., 2n frames) to prevent blocking. In another example, if the PRS period is less than or equal to the DRX cycle, PRS may be disallowed in the allocated or potentially allocated paging subframes (for example, subframes 0, 4, 5, and 9) in every n DRX cycles to ensure that every WTRU may read its pages at least once every n DRX cycles. Further, the unavailable subframes may be pre-defined, e.g., by the third generation partnership project (3GPP) standard, or signaled to the WTRU.

In another embodiment, the PRS periodicity may be assigned values that are not powers of 2 in terms of frames to reduce the frequency of collisions between PRS occurrences and POs. That is, collisions could no longer occur on consecutive POs. In particular, selecting values for PRS periodicity that share no common divisor with the DRX cycle lengths may minimize the frequency of collisions. For example, while the DRX cycle length may be 32, 64, 128, or 256, the PRS may instead be assigned values of 17, 33, 65, or 129. As another example, a non-integer number of frames may also be used for the PRS period, for example, 161 subframes which corresponds to 16.1 frames.

In another embodiment, the PDSCH carrying PCH may be allowed in RBs in any part of the cell transmission bandwidth of a subframe carrying PRS(s) that is not allocated for PRS(s), but not allowed in the cell transmission bandwidth of the subframe that is allocated for PRS(s). As an example, if the cell transmission bandwidth is 20 MHz and the PRS allocation only uses the center 10 MHZ, then the PDSCH carrying the PCH may be allowed in the 10 MHz not allocated for PRS(s) in the subframes carrying PRS(s).

It is noted that in Multicast Broadcast Single Frequency Network (MBSFN) allocated subframes, the first 1 or 2 symbols are always reserved for physical downlink control channel (PDCCH) per LTE specifications. PRS(s) may not be transmitted in those symbols. In order to align with normal subframes which may use the first 3 symbols for control, the 3rd symbol may not be used for PRS in both normal and MBSFN allocated subframes. The methods and procedures described herein are not materially affected by these considerations.

In another embodiment, the PRS(s) may be allocated to subframes that carry Multimedia Broadcast/Multicast Service (MBMS) services, and/or may be allocated to subframes that contain MBSFN RS(s) in either the entire subframe, or one or more resource blocks (RBs) contained therein. In a non-limiting example, the MBMS service may be carried by a physical multicast channel (PMCH) which is mapped to MBSFN allocated subframes and the MBSFN RS is used.

In an illustrative example of this embodiment, in a positioning subframe that is also an MBSFN allocated subframe, the rules for MBSFN allocated subframes may be applied whether or not MBSFN RSs are transmitted. The WTRU may assume that MBSFN RSs are transmitted and act accordingly based on the PRS pattern specified for an MBSFN allocated subframe with MBSFN RS.

In another illustrative example of this embodiment, in a positioning subframe, there is one PRS pattern transmitted that is the same in all subframes with the exception of the symbols and/or resource elements (REs) that are punctured based on conflict with other RS transmissions, such as Cell Specific RS (CRS) or MBSFN RS.

In another illustrative example of this embodiment, in a positioning subframe that is also an MBSFN allocated subframe, if some RBs contain MBSFN RS and others do not, the normal subframe PRS pattern in the RBs that do not contain MBSFN RS may be used as-is or with known modifications. For example, in a positioning subframe that is also an MBSFN allocated subframe, if some RBs contain MBSFN RSs and others do not, the normal subframe (depending on the broadcast number of PBCH ports) PRS pattern in the RBs that do not contain MBSFN RSs may be used. In another example, in a positioning subframe that is also an MBSFN allocated subframe, if some RBs contain MBSFN RSs and others do not, the normal subframe (for two PBCH ports, independent of the actual number of PBCH ports) PRS pattern in the RBs that do not contain MBSFN RSs may be used. In yet another example, in a positioning subframe that is also an MBSFN allocated subframe, if some RBs contain MBSFN RS and others do not, the normal subframe (for four PBCH ports, independent of the actual number of PBCH ports) PRS pattern in the RBs that do not contain MBSFN RSs is used. In still another example, in a positioning subframe that is also an MBSFN allocated subframe, if some RBs contain MBSFN RS and others do not, the normal subframe PRS pattern in the RBs that do not contain MBSFN RS is used, but the PRS is not punctured in the symbols and/or REs where the CRS exists in the normal subframe.

In another illustrative example of this embodiment, in a positioning subframe that is also an MBSFN allocated subframe, the PRS may not use symbols and/or REs containing MBSFN RS. In one example, in a positioning subframe that is also an MBSFN allocated subframe, for the case where an RE would contain an MBSFN RS and would also contain a PRS, the RE may contain the MBSFN RS, and the PRS may be punctured. In another example, in a positioning subframe that is also an MBSFN allocated subframe, the PRS may not use symbols that are used by MBSFN RSs. In yet another example, in a positioning subframe that is also an MBSFN allocated subframe, the normal subframe PRS pattern in MBSFN allocated subframes that contain MBSFN RS may be used, but the PRS REs are not punctured in the symbols and/or REs where the CRS exist in the normal subframe. Instead, the REs where the MBSFN RS exist are punctured. In a further example, in a positioning subframe that is also an MBSFN allocated subframe, if some RBs contain MBSFN RS and others do not, in the RBs containing MBSFN RS, the normal subframe PRS pattern may be used, but the PRS REs are not punctured in the symbols and/or REs where the CRS exist in the normal subframe. Instead, the PRS(s) that would otherwise be in the REs where the MBSFN RS exist are punctured.

In a further example, in a positioning subframe that is also an MBSFN allocated subframe, the normal subframe PRS pattern in MBSFN allocated subframes that contain MBSFN RS may be used, but the PRS REs are not punctured in the symbols and/or REs where the CRS exist in the normal subframe. Instead the PRS that would otherwise be in symbols where the MBSFN RS exist are punctured. An illustrative expression of the PRS pattern in the RBs containing the PRS may be shown as follows:

For $\Delta f = 15$ kHz:

$$k = 6m + (5 - l + v_{shift}) \mod 6$$

$$l = \begin{Bmatrix} 3, 4, 5 & \text{if } n_s \mod 2 = 0 \\ 1, 2, 3, 5 & \text{if } n_s \mod 2 = 1 \end{Bmatrix}$$

$$m = 0, 1, \ldots, 2 \cdot N_{RB}^{PRS} - 1$$

$$m' = m + N_{RB}^{max,DL} - N_{RB}^{PRS}$$

Note that the first 2 symbols are not used for PRS because they are reserved for the physical downlink control channel (PDCCH) and the 3$^{rd}$ symbol is not used since it contains the MBSFN RS. The same expression may be used in the case of 3 reserved control symbols. Also note that unlike PRS(s) in normal subframes, this expression is independent of the number of PBCH antenna ports.

Figure 3:
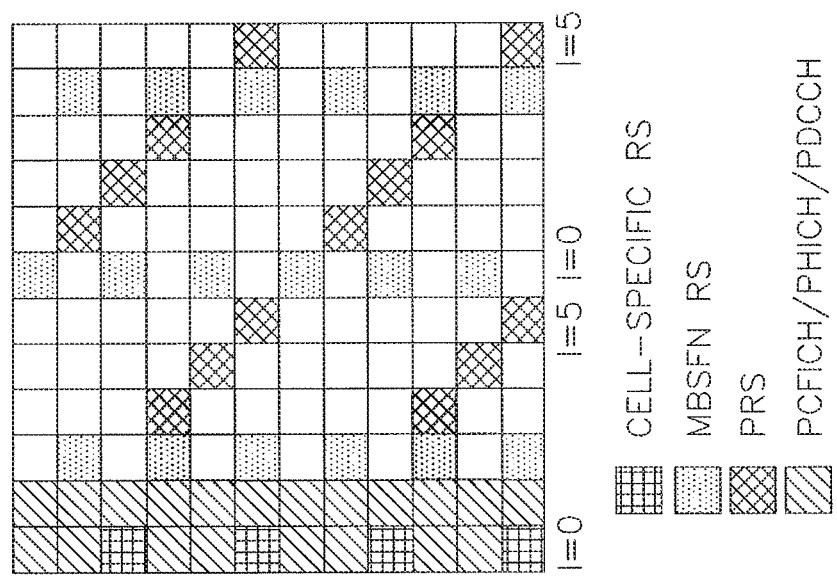
FIG. 3 shows an embodiment for placement of reference signals with respect to resource elements.

In yet a further example, as shown in FIG. 3, in a positioning subframe that is also an MBSFN allocated subframe, if some RBs contain MBSFN RS and others do not, in the RBs containing MBSFN RS, the normal subframe PRS pattern may be used, but the PRS REs are not punctured in the symbols and/or REs where the CRS exist in the normal subframe. Instead, the PRS that would otherwise be in symbols where MBSFN RS exist are punctured. Physical Control Format Indicator Channel (PCFICH), Physical Hybrid Automatic Repeat Request Indicator Channel (PH-ICH), and Physical Downlink Control Channel (PDCCH) are downlink control signals that may exist in the downlink control region of a subframe.

In another embodiment, PRS(s) in support of positioning measurements cannot be allocated to subframes that carry MBMS services, and/or cannot be allocated to subframes that contain MBMS RSs in the entire subframe, and/or cannot be allocated to subframes that contain MBSFN RS in at least one or more RBs contained therein.

In an illustrative example of this embodiment, the WTRU is un-aware of which MBSFN allocated subframes contain MBMS and/or carry MBSFN RS in at least a portion or the entire subframe. The WTRU may perform positioning measurements assuming PRS(s) is always present in all allocations indicated valid for PRS.

In another illustrative example of this embodiment, the WTRU is aware of which MBFSN-allocated subframes contain MBMS and/or MBSFN RS, and does not schedule positioning measurements for those subframes. In an example, the WTRU learns and builds the list of admissible MBSFN subframes through any of the procedures described herein for determining which subframes carry MBMS/MB-SFN RSs.

In another embodiment, in the positioning subframe, the PRS(s) may be superimposed (or overlaid) on downlink data and reference signals or only on the downlink data resource elements (REs). The base station may still transmit downlink data. However, the scheduled downlink data transmission may use lower transmit power, lower modulation and coding scheme (MCS), smaller transport block and/or a restricted set of resource blocks (RBs) than what the current link conditions would allow if the PRS(s) were not transmitted. The lowering of the downlink data rate via these methods allows for reliable data reception in the presence of the increased interference due to the transmission of the positioning signal. Also the base station may have leftover transmission (Tx) power to transmit the PRS(s) and this may also reduce interference of the data to the PRS(s).

The superposed PRS(s) may occupy the entire bandwidth of the LTE carrier/cell in order to achieve the required accuracy of time difference measurements and low signal+ interference to noise ratios (SINR) detection threshold (such as −30 dB). The waveform of the superposed PRS(s) may be a CDMA type (spread spectrum) signal, OFDM(A) type signal or other type of signal.

In another embodiment, the primary synchronization signals (PSS) in LTE Release 8 occupies the central 62 subcarriers and may be extended to the entire bandwidth to be used as superposed PRS(s) as described herein.

In another embodiment, the secondary synchronization signals (SSS) in LTE Release 8 occupy the central 62 subcarriers and may be extended to the entire bandwidth to be used as superposed PRS(s) as described herein.

In another embodiment, some RBs in the downlink subframes may be defined to transmit the PRS(s) while using the remaining RBs for legacy type LTE data transmission.

Disclosed herein are embodiments for positioning subframe allocation.

In one embodiment, when more than 1 downlink subframe may be used for time aggregation of a single positioning measurement sample, the downlink subframes used for positioning signals are not required to be consecutive.

In another embodiment, configuration of 3 and 5, and optionally 7 positioning subframes for time aggregation of measurement samples may be allowed in addition to the use of 1, 2, 4, and 6 configured subframes.

In another embodiment, subframes used for the PRS(s) and measurements are configurable over both 1 frame and 2 consecutive frames such that the set of subframes being used begins in one frame and ends in the next. An example for TDD downlink/uplink (DL/UL) configuration 2 may be subframes 8 and 9 in one frame followed by subframe 0 in the next frame.

In another embodiment for TDD, only a subset of the DL/UL configurations may be configurable by the system to support PRS(s). For example, due to the limitation of DL/UL configuration 0 having only subframes 0 and 5 as DL subframes, support of DL PRS(s) and the positioning methods requiring these PRS(s) (for example observed time difference of arrival (OTDOA)) may not be supported for configuration 0.

In another embodiment, as a function of the DL/UL configuration decoded by the WTRU in system information block (SIB) 2, the WTRU may consider as an error any positioning assignment that is inconsistent with that configuration. For example, in the example above in which DL/UL configuration 0 does not support DL PRS(s), the WTRU would consider it an error if the WTRU decoded that the DL/UL configuration is 0 and the network requested the WTRU to perform measurements on DL PRS(s).

In another embodiment, certain subframes in each frame may be designated unavailable for PRS(s). The unavailable subframes may be pre-defined or signaled to the WTRU. Examples of subframes that may be designated unavailable are those containing system signals. For example, the method may disallow the assignment of subframe 0 and subframe 5 from being assigned as positioning subframes. For FDD, the method may disallow the assignment of subframe 4 and/or subframe 9 from being assigned as positioning subframes. For TDD, the method may disallow the assignment of subframe 1 and/or subframe 6 from being assigned as positioning subframes.

In another embodiment for TDD, special subframe configurations may carry PRS(s). The WTRU may consider as an error any positioning assignment that is inconsistent with the special subframes that may or may not carry PRS(s).

In another embodiment, when normal subframes are used in TDD, PRS(s) may be allowed in DL subframe 6, which is a subframe excluded from MBSFN allocations for TDD.

In another embodiment for TDD, a cell may be allowed to transmit DL PRS(s) in subframes designated as UL subframes (per the cell's DL/UL configuration) when that cell makes no UL allocations for that subframe (i.e., it issues no UL grants for that subframe) and either prevents (by appropriate scheduling of DL data transmissions), or ignores, UL acknowledgement/negative acknowledgement (ACK/NACK) transmissions in that subframe.

Embodiments for subframe allocation configuration are disclosed herein. In all embodiments described herein, configuration may be provided to the WTRU by signaling (e.g., radio resource control (RRC) signaling, physical layer signaling, and other similar signaling levels), possibly combined with a priori known information (e.g., information fixed by the standard). Signaling may include broadcast and/or dedicated signaling to the WTRU.

In a first embodiment, if there are any subframes that may not be used for PRS(s) (referred to as unavailable subframes herein), the specified number of "consecutive" subframes (in the configuration) would skip over those subframes. This may be applied to both FDD and TDD.

The following information may, for example, be provided to the WTRU. The WTRU may be provided with the frames that contain the PRS(s). For example, the frame allocation may be provided the same way the frames are defined for MBSFN, i.e., PRS(s) may occur in frames when system frame number (SFN) mod P=Offset, where P is the periodicity of the PRS(s) in frames and Offset is a value in frames, so the allocated frames become Offset, P+Offset, 2P+Offset, and so on. For the case where the PRS(s) cross into a second frame (as described herein), only the information for the first frame may need to be provided. The second frame may be understood without additional information, (e.g., for the example above, SFN mod P=Offset provides the first frame of the 2 consecutive frames).

The WTRU may be provided with the starting subframe within the frame (e.g., an offset) and the number of consecutive subframes (where subframes that do not support positioning signals are skipped over). For example, in TDD configuration 2 with starting subframe 4 and the consecutive subframes=4, if all DL subframes support PRS(s) and all UL and special subframes do not support PRS(s), this would correspond to subframes 4, 5, 8, and 9. Subframe 6 may be skipped because it is a special subframe and subframe 7 may be skipped because it is an UL.

The number of consecutive subframes may instead be provided as a number of additional consecutive subframes since the starting subframe may be understood to contain (or not contain) PRS(s) (e.g., based on definitions in the standard). For the example above, the number of additional consecutive subframes would be 3 (instead of 4 consecutive subframes). The resulting subframes to use would be the same and only the value signaled to the WTRU changes.

In addition, the information provided may also allow for the possibility of continuing in the next frame. For example, extending the examples above, in configuration 2 with starting subframe 4, consecutive subframes=5 (or the additional consecutive subframes=4), and with all DL subframes supporting PRS(s) and all UL and special subframes not supporting PRS(s), this would correspond to subframes 4, 5, 8, and 9 in one frame and subframe 0 in the next frame.

Further, the unavailable subframes may be pre-defined, e.g., by the standard, or signaled to the WTRU.

The unavailable subframes may be independent of, or a function of, the DL/UL configuration in TDD and/or other constraints in TDD or FDD.

The same signaling may be used in a FDD half-duplex mode, that is, for those FDD WTRUs that cannot transmit and receive simultaneously.

In a first variation of the first embodiment, a number of bits, B, used to signal the starting subframe and the number of consecutive (or additional consecutive) subframes, N, may be limited to a small number as described herein. For example, there are 10 subframes in a frame which may be numbered 0-9. The starting subframe may be provided and limited to a number less than 9 to reduce the number of bits used. For example, if the starting subframe were to be 0 to 7, this may limit the starting subframe to 3 bits. The maximum value of N would dictate the number of bits needed for N. For example, if the maximum allowed value of N were 7, only 3 bits would be needed for N. The configuration of starting subframe and which subframes to use may be accomplished in 6 bits based on the example above.

In a second variation of the first embodiment, a number of bits, B, used to signal the starting subframe may be an index, rather than an explicit starting subframe number within the frame. The index may be based on a subset of the subframes in the frame such as the available subframes for positioning signals. As an example, the maximum number of whole subframes in a frame for TDD is 8. Rather than specify an explicit starting subframe number from 0 to 9, which would require 4 bits, the starting subframe number may be treated as an index from 0 to 7 into the list of DL subframes allocated in the current configuration. For example, with configuration 4, a signaled start value of 6 would map to subframe #9.

In a second embodiment, a bitmap is used to identify which subframes may contain the PRS(s). The information provided to the WTRU may include the frames that contain PRS(s) as discussed herein and a bitmap to indicate which subframes are for the PRS(s). For example, for PRS(s) in a single frame, a bitmap equaling 1001110100 would correspond to subframes 0, 3, 4, 5, and 7. This may be extended to cover subframes in 2 consecutive frames. A total of 10 bits may be used for each frame for a total of 20 bits.

In a first variation of the second embodiment, less bits may be used to be more efficient since the span will unlikely be more than 7 subframes total. The worst case would therefore span the last subframe of the first frame and 6 subframes in the second frame, which would require a total of 16 bits.

In a second variation of the second embodiment, given a starting subframe, N bits may be used to represent the next N subframes, reducing the number of bits needed. The following information may be provided to the WTRU: a) the frames that contain the PRS(s) as discussed herein; b) the starting subframe number within the frame (i.e., an offset); and c) a bitmap to indicate which subframes are for the PRS(s), starting with the subframe identified as the starting subframe.

In this variation, there may be 10 subframes in a frame which may be numbered 0-9. The starting subframe may be provided and limited to a number less than 9 to reduce the number of bits used. For example, if the starting subframe were to be 0 to 7, this may limit the starting subframe to 3 bits. The maximum value of N would dictate the number of bits needed for N. For example, if the maximum allowed value of N were 7, 7 bits would be needed for N. Note that depending on the definition of N, it may include or exclude the starting subframe in the bitmap. If the starting subframe is excluded, it would need to be known (e.g., by definition) whether PRS(s) are in that subframe or not. Based on the examples above, the configuration of starting subframe and which next subframes to use may be accomplished in 3+7=10 bits.

In a third variation of the second embodiment, the number of bits, B, used to signal the starting subframe may be an index, rather than an explicit starting subframe number within the frame. This may be based on a subset of the subframes in the frame such as the available subframes for PRS(s).

In a fourth variation of the second embodiment, if there are any unavailable subframes that cannot be used for positioning, the number of bits used to convey which subframes to use automatically skips over the unavailable subframes. The unavailable subframes may be pre-defined, e.g., by the standard, or signaled to the WTRU. The unavailable subframes may be independent of, or a function of, the DL/UL configuration in TDD or other constraints in TDD or FDD. For example, when 10 bits are used to represent 10 subframes, and if subframe 5 is unavailable, then no bit is needed for subframe 5. Therefore, 9 bits instead of 10 bits may be used. An example bitmap of 10011x0100, which is using 1 to represent subframes to use for positioning and x to represent the unavailable subframe 5, could be represented in 9 bits as 100110100 and would correspond to designating subframes 0, 3, 4, and 7 for positioning use. This may be applied to the other embodiments disclosed herein.

In a third embodiment, a number of consecutive (i.e., a span) of subframes may be provided, and the PRS(s) may only be in the available subframes within that span. The following information may be provided to the WTRU: a) frames that contain PRS(s) as disclosed herein; and b) the starting subframe within the frame (i.e., an offset); and c) the number of consecutive subframes (where only the available subframes are used within that span). For example, in TDD configuration 2 with starting subframe 4 and consecutive subframes=5, if all DL subframes support PRS(s) and all UL and special subframes do not support PRS(s), this would correspond to subframes 4, 5, and 8 (span is 4, 5, 6, 7, and 8, with subframe 6 not usable because it is a special subframe and subframe 7 not usable because it is an UL).

In this embodiment, the number of consecutive subframes may instead be provided as a number of additional consecutive subframes since the starting subframe may be understood to contain (or not contain) PRS(s) (e.g., based on definition in the standard). For the example above, the number of additional consecutive subframes would be 4 (instead of 5 consecutive subframes). The resulting subframes to use would be the same and only the value signaled to the WTRU changes.

This embodiment also allows for the possibility of continuing in the next frame. By extending the examples above, in configuration 2 with starting subframe 4 and the consecutive subframes=7 (or the additional consecutive subframes=6), this would correspond to subframes 4, 5, 8, and 9 in one frame and subframe 0 in the next frame (span is 4, 5, 6, 7, 8, 9, and 0, with 6 and 7 not usable since 6 is a special subframe and 7 is an UL subframe).

The same signaling may be used in a FDD half-duplex mode, that is, for those FDD WTRUs that cannot transmit and receive simultaneously.

In a first variation of the third embodiment, the first variation of the first embodiment (e.g., explicit values) may be applied to this embodiment.

In a second variation of the third embodiment, the second variation of the first embodiment (e.g., index values) may be applied to this embodiment.

In a fourth embodiment, a table may be defined where each row contains an index and a corresponding subframe allocation to be used for the PRS(s). The following information may be provided to the WTRU: a) the frames that contain the PRS(s) as discussed herein; and b) index into the table that identifies which subframes to use, where i) index may be dependent on mode (FDD or TDD) and ii) index may be dependent on DL/UL configuration for TDD.

In a fifth embodiment, when MBSFN-reserved subframes are used for PRS(s), the maximum periodicity is currently 32 frames and may be modified to include a frame periodicity of 64 or 128 frames. This may be implemented by increasing the allowed periodicity of the MBSFN-reserved subframe allocation to match the desired maximum periodicity of the positioning subframes. For example, add 2 additional choices of 64 and 128 frames.

In an alternative implementation, a mapping may be overlaid on top of the MBSFN-reserved subframe allocation and which allocations are to be used for PRS(s) are indicated. An example mapping may be to use every other MBSFN-reserved subframe allocation or every $4^{th}$ MBSFN-reserved subframe allocation to achieve a 64 or 128 frame periodicity for an MBSFN-reserved subframe allocation with a 32 frame periodicity.

Signaling this allocation to the WTRU may be accomplished by identifying which MBSFN-reserved subframe allocation to use and what the overlaid mapping is. An example would be signaling 0 for every allocation, 1 for every other allocation, 2 for every $4^{th}$ allocation, and so on.

Embodiments for methods that determine which subframes carry MBMS/MBSFN RSs are herein disclosed. In an embodiment, the WTRU supporting positioning measurements such as PRS(s) determines which MBSFN allocated subframes contain MBSFN RS, or carry MBMS service. In an illustrative example of this embodiment, explicit signaling between network node(s) and WTRU(s) may be used to determine if PMCH data and/or MBSFN RS exists in an MBSFN allocated subframe. Information provided to the WTRU may indicate that the PMCH data and/or MBSFN RS exist in the entire subframe or specific portions (e.g., RBs or REs) of the subframe. In an embodiment of this example, a WTRU supporting positioning measurements determines from reading system information, either in the form of broadcast channel (BCH)/System Information Blocks (SIBs) or dedicated radio resource control (RRC) signaling, whether one or more MBSFN allocated subframes contain MBMS and/or whether one or more subframes contain MBMS RS.

In another illustrative example of this embodiment, the WTRU performs blind detection to determine which MBSFN allocated subframes contain MBMS and/or if they contain PMCH data and/or MBSFN RS.

It is known that if a MBSFN subframe has a MBMS signal, then automatic gain control is run on the control region and run again on the payload region. Described herein is an embodiment when a PRS is present in a MBSFN subframe. In this embodiment, if a PRS is present in the MBSFN subframe, then the automatic gain control is run on the control region but not on the payload region. The automatic gain control from the control region may be used for the payload region.

Embodiments for PRS sequences are disclosed herein. In one embodiment of a PRS, polyphase sequences or constant amplitude zero auto-correlation (CAZAC) sequences (such as a Zadoff-Chu sequence) may be used for the PRS (no matter whether it is code division multiple access (CDMA) or orthogonal frequency division multiple (access) (OFDMA) type of signal).

In another embodiment of a PRS, M-sequence or other pseudo-random sequences may be used for the PRS(s).

In yet another embodiment of a PRS, the common reference signals (CRS) in LTE Release 8 occupy scattered/staggered resource elements (REs) in each subframe that may be extended to all REs in the subframe to be used as superposed PRS(s). Alternatively, the PRS(s) may be a sequence which builds on the CRS and allows the legacy CRS to be used without modification as part of the PRS, while adding additional superimposed signals over the data REs.

Although features and elements are described above in particular combinations, each feature or element may be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs);_Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

What is claimed is:

1. A wireless transmit receive unit (WTRU) comprising:
a transceiver; and
a processor, wherein:
the transceiver and the processor are configured to receive a reference signal of a first type, wherein the first type is other than a demodulation reference signal (DM-RS), and wherein reference signals of the first type are received in resource elements other than resource elements used for a primary synchronization signal or a secondary synchronization signal; and
the transceiver and the processor are further configured to receive a radio resource control message indicating a subframe position in which the reference signal of the first type is transmitted, a periodicity of a transmission of the reference signal of the first type, and a number of antenna ports.

2. The WTRU of claim 1, wherein the radio resource control message indicates a resource configuration of the reference signal of the first type in a time domain and a frequency domain.

3. The WTRU of claim 1, wherein the radio resource control message indicates a resource block configuration of the reference signal of the first type.

4. The WTRU of claim 1, wherein the reference signal of the first type is a positioning reference signal.

5. The WTRU of claim 1, wherein the reference signal of the first type is derived from a pseudo-random sequence.

6. A method implemented by a wireless transmit/receive unit (WTRU), the method comprising:
receiving a reference signal of a first type, wherein the first type is other than a demodulation reference signal (DM-RS), and wherein reference signals of the first type are received in resource elements other than resource elements used for a primary synchronization signal or a secondary synchronization signal; and
receiving a radio resource control message indicating a subframe position in which the reference signal of the first type is transmitted, a periodicity of a transmission of the reference signal of the first type, and a number of antenna ports.

7. The method of claim 6, wherein the radio resource control message indicates a resource mapping configuration of the reference signal of the first type in a time domain and a frequency domain.

8. The method of claim 6, wherein the radio resource control message indicates a resource block configuration of the reference signal of the first type.

9. The method of claim 6, wherein the reference signal of the first type is a positioning reference signal.

10. The method of claim 6, wherein the reference signal of the first type is derived from a pseudo-random sequence.

\* \* \* \* \*